United States Patent
Buck et al.

(10) Patent No.: US 7,275,425 B2
(45) Date of Patent: Oct. 2, 2007

(54) METHOD FOR TESTING AT LEAST THREE SENSORS, WHICH DETECT A MEASURABLE VARIABLE FOR AN INTERNAL COMBUSTION ENGINE

(75) Inventors: Rainer Buck, Tamm (DE); Andreas Kratter, Besigheim (DE); Dirk Foerstner, Stuttgart (DE); Michael Walter, Kornwestheim (DE); Juergen Sojka, Gerlingen (DE); Matthias Stegmaier, Waiblingen-Hohenacker (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 10/532,783

(22) PCT Filed: Oct. 20, 2003

(86) PCT No.: PCT/DE03/03517
§ 371 (c)(1),
(2), (4) Date: Dec. 12, 2005

(87) PCT Pub. No.: WO2004/040104
PCT Pub. Date: May 13, 2004

(65) Prior Publication Data
US 2006/0137436 A1    Jun. 29, 2006

(30) Foreign Application Priority Data
Oct. 23, 2002 (DE) ................................ 102 49 344
Sep. 9, 2003 (DE) ................................ 103 41 454

(51) Int. Cl.
*G01M 15/00* (2006.01)
(52) U.S. Cl. ..................................................... 73/116
(58) Field of Classification Search .................. 73/116, 73/117.2, 117.3, 118.1, 119 R; 701/34
See application file for complete search history.

(56) References Cited

U.S. PATENT DOCUMENTS

| | | | |
|---|---|---|---|
| 4,058,975 A | | 11/1977 | Gilbert et al. |
| 4,416,149 A | * | 11/1983 | Kitamura et al. ........... 73/118.2 |
| 5,003,816 A | * | 4/1991 | Furuyama .................. 73/117.3 |
| 5,033,290 A | * | 7/1991 | Seki et al. .................. 73/118.1 |
| 5,906,184 A | * | 5/1999 | Maruyama et al. ..... 123/339.15 |
| 5,928,303 A | * | 7/1999 | Sakai .......................... 701/109 |
| 6,032,519 A | * | 3/2000 | Ishii et al. .................. 73/117.3 |
| 6,065,446 A | * | 5/2000 | Engl et al. ................... 123/325 |
| 6,145,490 A | * | 11/2000 | Heidenfelder et al. ...... 123/295 |
| 6,952,953 B2 | * | 10/2005 | Plote et al. ............... 73/119 R |

* cited by examiner

*Primary Examiner*—Edward Lefkowitz
*Assistant Examiner*—Jermaine Jenkins
(74) *Attorney, Agent, or Firm*—Kenyon & Kenyon LLP

(57) ABSTRACT

A method for checking at least three sensors which detect a measured quantity in the area of an internal combustion engine. A measure of the sensor signal of the particular sensor to be checked is compared to a reference signal which is obtained from at least one part of the sensor signals of the sensors to be checked. A sensor is recognized as defective on the basis of a comparison of the measure for the sensor signal with the reference signal. The reference signal is formed, for example, from a mean value of a measure of the sensor signals of at least one part of the sensors to be checked, the individual sensor signals being weighted using correction factors in forming the mean value. The sensors are temperature sensors or pressure sensors, for example, which may be situated in an intake area of the internal combustion engine, on the internal combustion engine itself, in an exhaust area, and/or in an exhaust gas treatment system.

10 Claims, 4 Drawing Sheets

METHOD FOR TESTING AT LEAST THREE SENSORS, WHICH DETECT A MEASURABLE VARIABLE FOR AN INTERNAL COMBUSTION ENGINE

PRIORITY APPLICATION INFORMATION

The German priority applications nos. 102 49 344.8 and 103 41 454.1 are hereby incorporated by reference.

FIELD OF THE INVENTION

The present invention relates to a method for checking at least three sensors which detect a measured quantity in the area of an internal combustion engine.

BACKGROUND INFORMATION

To observe the limiting values of the exhaust gas in internal combustion engines, exhaust gas treatment systems are used which contain a catalytic converter, a particle filter or other components suitable for exhaust gas treatment, for example. The components used often operate in an optimum manner only in a certain temperature range. If the components have storage properties regarding at least one exhaust gas component, the laden state by the exhaust gas component must be monitored.

To detect the temperature as a measured quantity, temperature sensors are used, which may be situated in the intake area, on the internal combustion engine itself, or in the exhaust area. To detect pressure as a measured quantity, pressure sensors are used, which may be used to determine the laden state of a particle filter, for example. The pressure sensors detect the pressure difference occurring at the particle filter, which is a measure of the laden state. Additional pressure sensors may be situated in the intake area of the internal combustion engine.

If a sensor delivers an erroneous signal, this may result in erroneous control of the internal combustion engine and of the exhaust gas treatment system. The consequences include increased fuel consumption of the internal combustion engine and increased exhaust gas emissions.

Proper operation of the overall system is ensured only if the sensors used deliver a reliable sensor signal. German patent document no. 101 12 139 discusses a method for monitoring sensors which detect a measured quantity of an internal combustion engine. These may include temperature sensors, pressure sensors or other sensors. The individual sensor signals are compared to a reference signal delivered by an additional sensor, which is not involved in the diagnosis itself.

The sensor which is not involved in the diagnosis is situated at a point where there is a relatively light load on the sensors such as the intake area in which a temperature sensor is exposed to less temperature fluctuations than it would be in the exhaust area. Defective sensors are detected by forming the difference between the individual sensor signals of the sensors to be monitored and the reference signal of the non-monitored sensor and comparing it to the predefined threshold values. If no error is recognized in the preceding procedure steps, a plausibility check is finally performed by forming the differences between the signals of the sensors being monitored and comparing them to threshold values.

SUMMARY OF THE INVENTION

An object of the present invention is to provide a method for checking at least three sensors which detect a measured quantity in the area of an internal combustion engine, which delivers a reliable result while using simple monitoring means.

According to the method of the present invention, a measure for the sensor signal of the particular sensor to be checked is compared to a reference signal; the reference signal is obtained from at least part of the sensor signals of the sensors to be checked; and a sensor is recognized as defective on the basis of a comparison of the measure for the sensor signal and the reference signal.

With the method according to the present invention, all sensors are involved in the diagnosis. Another important advantage is that, when the check is based on checking at least three sensors, a defective sensor may be immediately recognized using simple comparison operations.

In one embodiment the reference signal is formed from an average of a measure of the sensor signals of at least one part of the sensors to be checked. This procedure allows the reference signal to be provided in a very simple manner. In an advantageous refinement of this embodiment, each sensor signal is weighted using a predefined factor when forming the average. Involving a weighting factor permits the importance and location of the individual sensors to be taken into account.

A simple check is made possible by a sensor being recognized as defective if the difference between the measure for the sensor signal and the reference signal exceeds a predefined threshold value.

If the reference signal is distorted by at least one defective sensor, the embodiment in which the sensor whose measure for the sensor signal is farthest from the reference signal is recognized as defective still permits a defective sensor to be reliably recognized.

In a refinement of the method according to the present invention, the check is performed in a steady-state operation or at a standstill or after a cold start of the internal combustion engine. The refinement ensures that the sensor signals of the at least three sensors to be checked have an at least approximately constant value, so that the check yields a reliable result. At standstill or after a cold start of the internal combustion engine, the sensor signals have a value which is defined by the environmental conditions. Sensor signals of temperature sensors largely reflect the temperature of the environment.

The measure of detecting the standstill of the internal combustion engine, a timer being provided which is started when standstill is detected, and performing the check after the elapse of a predefined time period ensures that the sensor signals are actually steady when the internal combustion engine is at standstill.

Another measure which ensures that the steady-state operation, the standstill, or the cold start of the internal combustion engine exists provides for a comparison between a sensor signal of at least one selected sensor which has a slow rate of change and a sensor signal of a sensor to be checked. The selected sensor is situated on a component which has the greatest possible inertia with respect to the sensor signal. In the case of a temperature sensor, this is a component having a high heat capacity.

In a refinement of the method according to the present invention, the sensor signal of a sensor recognized as defective is not taken into account when determining the reference signal. The exclusion of the defective sensor in further checks ensures that the reference signal is not distorted. In another measure, no check is performed if the number of sensors recognized as defective exceeds a predefined number.

DETAILED DESCRIPTION

Figure 1:
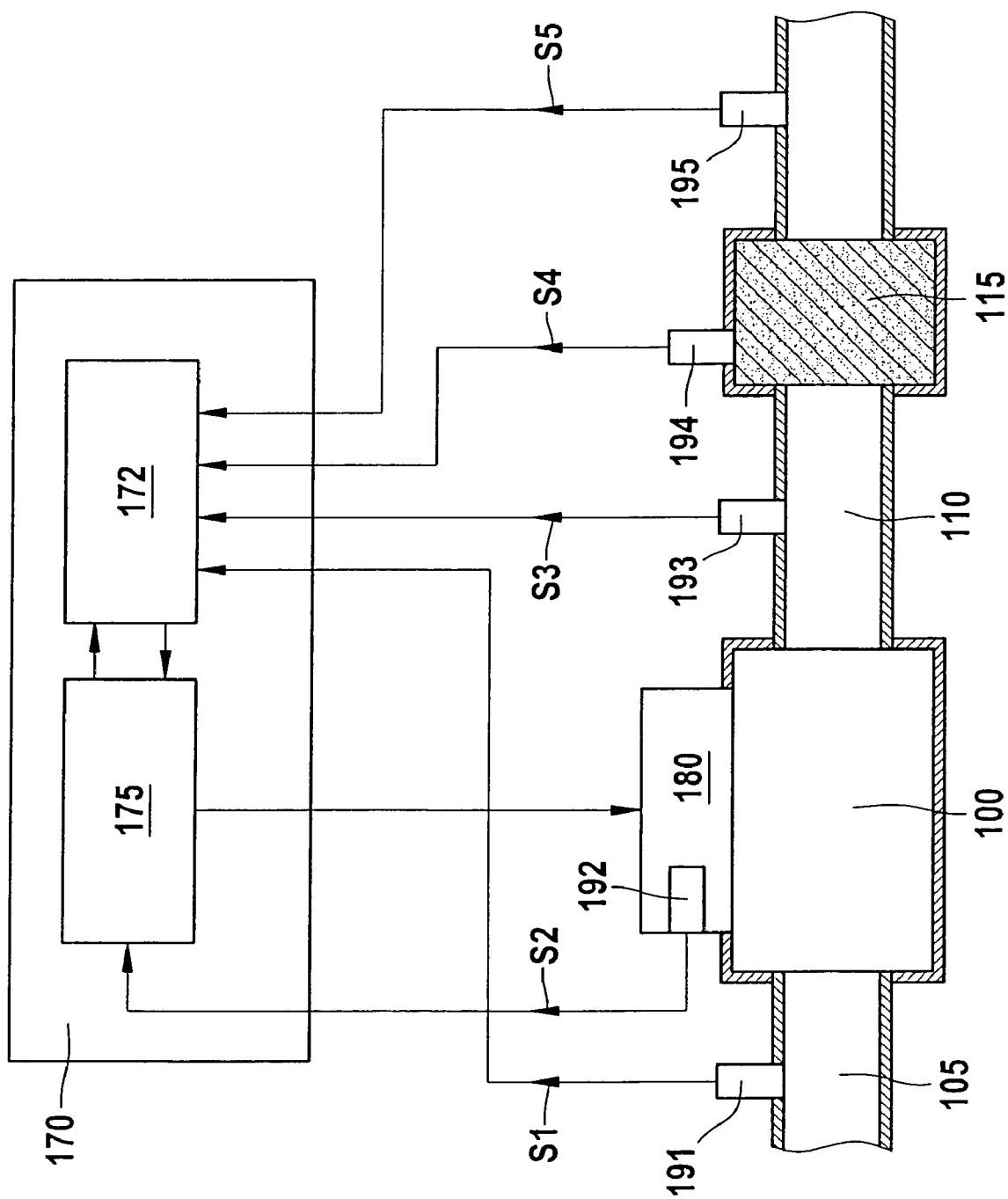
FIG. 1 shows a block diagram of an internal combustion engine and a controller.

Fresh air is supplied to internal combustion engine 100 via an intake area 105. The exhaust gases of internal combustion engine 100 pass through an exhaust gas area 110. An exhaust gas treatment system 115 is situated in exhaust gas area 110. This may be a catalytic converter and/or a particle filter. Exhaust gas treatment system 115 may include a plurality of catalytic converters for different harmful substances, or combinations of at least one catalytic converter and a particle filter.

Furthermore, a control unit 170 is provided, which contains at least one engine control unit 175 and one exhaust gas treatment control unit 172. Alternatively, engine control unit 175 and exhaust gas treatment control unit 172 may also be situated separately. Engine control unit 175 supplies control signals to a fuel metering system 180. Furthermore, engine control unit 175 and/or exhaust gas treatment control unit 172 supply signals to one another and/or to additional control units.

Furthermore, sensors supplying signals to exhaust gas treatment control unit 172 and engine control unit 175 are provided. A first sensor 191 supplies a sensor signal S1 which characterizes the state of the fresh air. A second sensor 192 supplies a sensor signal S2 which characterizes the state of fuel metering system 180. A third sensor 193 supplies a sensor signal S3 which characterizes the state of exhaust gas upstream from exhaust gas treatment system 115. A fourth sensor 194 supplies a sensor signal S4 which characterizes the state of exhaust gas treatment system 115. A fifth sensor 195 supplies a sensor signal S5 which characterizes the state of the exhaust gases downstream from exhaust gas treatment system 115. All five sensors 191, 192, 193, 194, 195 detect a single measured quantity in the area of internal combustion engine 100. The measured quantity is the temperature, for example. Alternatively, the measured quantity may be the pressure. Other measured quantities, such as acceleration or rotational speed, are also conceivable.

Depending on the embodiment, all illustrated sensors 191, 192, 193, 194, 195 may be provided. In alternative embodiments, the minimum number of three sensors or more than the illustrated five sensors 191, 192, 193, 194, 195 may be provided.

The method according to the present invention for checking at least three sensors 191, 192, 193, 194, 195 which detect a measured quantity in the area of internal combustion engine 100 works as follows:

On the basis of sensor signals S1, S2, S3, S4, S5, engine controller 175 computes a control signal to be supplied to fuel metering system 180. Fuel metering system 180 then meters the corresponding amount of fuel to internal combustion engine 100. The harmful exhaust gas components produced during combustion are converted into harmless components in one or more catalytic converters contained in exhaust gas treatment system 115. Exhaust gas treatment system 115 may contain a particle filter to remove the particles contained in the exhaust gas. A catalytic converter operates in an optimum manner in a certain temperature range. A particle filter is also regenerated in an optimum manner in a certain temperature range. Sensors 191, 192, 193, 194, 195 designed as temperature sensors detect the temperature at various points.

The exhaust gas temperature of internal combustion engine 100 may be maintained at a predefined temperature level or in a predefined temperature range using these sensors 191, 192, 193, 194, 195. Sensors 191, 192, 193, 194, 195 designed as pressure sensors determine the pressures occurring in intake area 105, at internal combustion engine 100, and/or in exhaust area 110. For example, the laden state of the particle filter may be determined on the basis of the occurring pressure difference. First sensor 191 situated in intake area 105 detects, for example, the air pressure which may be taken into account when determining the air-fuel mixture.

Checking the proper operation of the at least three sensors 191, 192, 193, 194, 195 ensures the proper operation of internal combustion engine 100 and in particular of exhaust gas treatment system 115.

Figure 2:
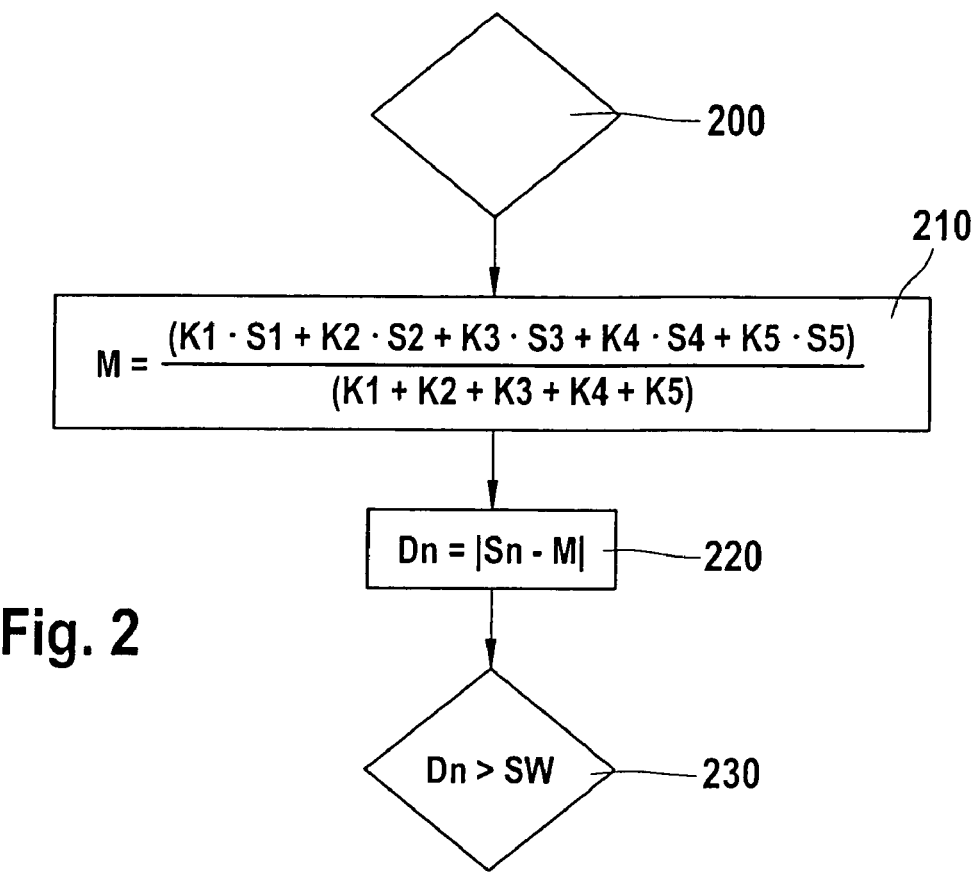
FIG. 2 shows a flow chart of an exemplary method according to the present invention.

FIG. 2 shows a further embodiment according to the present invention on the basis of a flow chart. A first query 200 checks whether there are operating states in which a check is possible. Such operating states exist in particular when internal combustion engine 100 is in a steady-state operation, when internal combustion engine 100 is shut off and is at a standstill, or when engine 100 has just been started and is still in the cold start phase.

In an advantageous embodiment, the standstill of internal combustion engine 100 is detected. For this purpose, a provided timer outputs a signal after the elapse of a predefined period of time; when this occurs, it may be assumed that a sufficiently long standstill of internal combustion engine 100 has occurred. If internal combustion engine 100 is started after a sufficiently long standstill, a cold start may be assumed.

In an advantageous embodiment which detects a steady-state operation, the standstill, and/or the cold start of internal combustion engine 100, sensor signal S1, S2, S3, S4, S5 of a selected sensor 191, 192, 193, 194, 195 which has a slow rate of change is compared to sensor signal S1, S2, S3, S4, S5 of at least one other sensor 191, 192, 193, 194, 195. If sensors 191, 192, 193, 194, 195 are temperature sensors, the sensor signal of sensor 191, 192, 193, 194, 195 which detects the temperature of the medium having the greatest heat capacity is used. In the illustrated exemplary embodiment, this is preferably second sensor 192, which detects the temperature of fuel metering system 180. In this embodiment it is determined that the entire system is in a state of equilibrium, which occurs in a steady-state operation, at the standstill, or at a cold start of internal combustion engine 100. It is irrelevant whether sensor 191, 192, 193, 194, 195 itself or the medium whose temperature is being detected has a high heat capacity. A steady-state operation, a standstill, or a cold start of internal combustion engine 100 exists when the difference between the sensor signal of selected sensor 191, 192, 193, 194, 195 and the at least one other sensor 191, 192, 193, 194, 195 is less than a predefined threshold value.

In a refinement of this embodiment, the sensor signals of two selected sensors 191, 192, 193, 194, 195 which have a slow rate of change are used for the comparison. In this case it is sufficient if at least one difference meets the criterion.

After it has been established in first query 200 whether such an operating state exists, a mean value M of a measure of sensor signals S1, S2, S3, S4, S5 of sensors 191, 192, 193, 194, 195 to be checked is formed in a first function block 210. In this exemplary embodiment mean value M is the reference signal. Individual sensor signals S1, S2, S3, S4, S5 are preferably weighted when forming the mean value. Correction factors K1, K2, K3, K4, K5 are used for weighting. Weighting makes it possible to take into account the importance of individual sensors 191, 192, 193, 194, 195 and/or their locations.

An important advantage results from the fact that the weighting of those sensors 191, 192, 193, 194, 195 which, in a steady-state operation, at a standstill, or during a cold start of internal combustion engine 100, deliver different sensor signals depending on the environmental conditions may be reduced. It may occur, for example, that first sensor 191 detects different temperatures under sunny conditions than under cloudy conditions at the same ambient temperature if internal combustion engine 100 is situated in a motor vehicle.

Even in this case, a steady-state operation, a standstill, or a cold start of internal combustion engine 100 is present in which a check of sensors 191, 192, 193, 194, 195 according to the present invention is enabled.

In a subsequent second function block 220, differences Dn of individual sensor signals Sn with respect to mean value M determined in first function block 210 are determined. In a second query 230, individual differences Dn are compared to a threshold value SW. The particular difference Dn which exceeds threshold value SW indicates sensor 191, 192, 193, 194, 195 which is probably defective.

Figure 3:
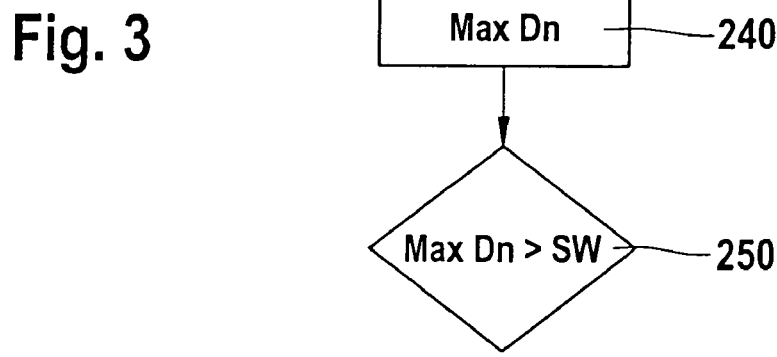
FIG. 3 shows a flow chart of another exemplary method according to the present invention.

FIG. 3 shows an alternative embodiment. Differences Dn between individual sensor signals Sn and mean value M are determined again in second function block 220. In a subsequent third function block 240, maximum difference Max Dn is determined. In subsequent third query 250 a check is performed to determine whether determined maximum difference Max Dn exceeds a predefined threshold value SW. If this is the case, this sensor 191, 192, 193, 194, 195 having the maximum difference is probably defective. The advantage of this alternative embodiment is that a defective sensor 191, 192, 193, 194, 195 whose sensor signal S1, S2, S3, S4, S5 may distort mean value M determined in function block 210 does not result in too many sensors 191, 192, 193, 194, 195 being erroneously classified as defective in the check of second query 230.

Figure 4:
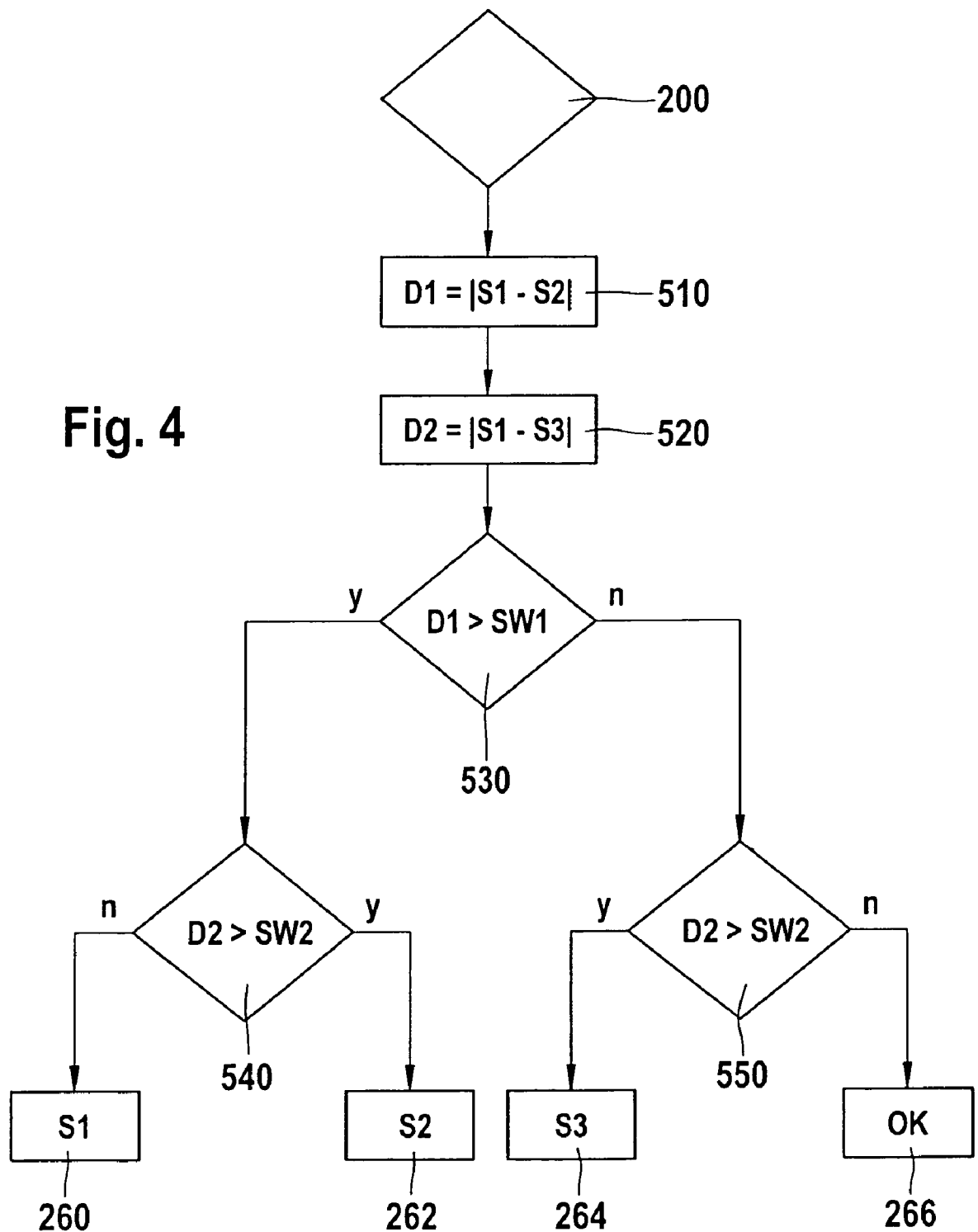
FIG. 4 shows a flow chart of another exemplary method according to the present invention.

FIG. 4 shows another alternative embodiment. In this embodiment, the reference signal is obtained from a measure of a sensor signal S1, S2, S3, S4, S5 of a single sensor 191, 192, 193, 194, 195 to be checked. In the simplest case, the reference signal is identical to sensor signal S1, S2, S3, S4, S5. This case is shown in FIG. 4. Furthermore, for reasons of clarity, the exemplary embodiment according to FIG. 4 is limited to three sensors 191, 192, 193.

First query 200, described above, detects whether an operating state of internal combustion engine 100 exists in which monitoring is allowed. If this is the case, a first difference D1 between sensor signal S1 of first sensor 191 and sensor signal S2 of second sensor 192 is determined in function block 510. In subsequent function block 520, a second difference D2 between sensor signal S1 of first sensor 191 and sensor signal S3 of third sensor 193 is determined.

Subsequent query 530 checks whether first difference D1 is greater than a first threshold value SW1. If this is the case, an additional query 540 checks whether second difference D2 is greater than a second threshold value SW2. If this is not the case, first sensor S1 is recognized as defective in a function block 560. If it is determined in query 540 that second difference D2 is greater than second threshold value SW2, second sensor S2 is recognized as defective in a function block 262.

If it is determined in query 530 that first difference D1 is not greater than first threshold value SW1, a query 550 checks whether second difference D2 is greater than second threshold value SW2. If this is the case, third sensor S3 is recognized as defective in a function block 264. If differences D1, D2 are less than threshold values SW1 and SW2, function block 266 determines that no error is present.

Threshold values SW1 and SW2 have preferably the same value. However, threshold values SW1 and SW2 may also have different values.

Figure 5:
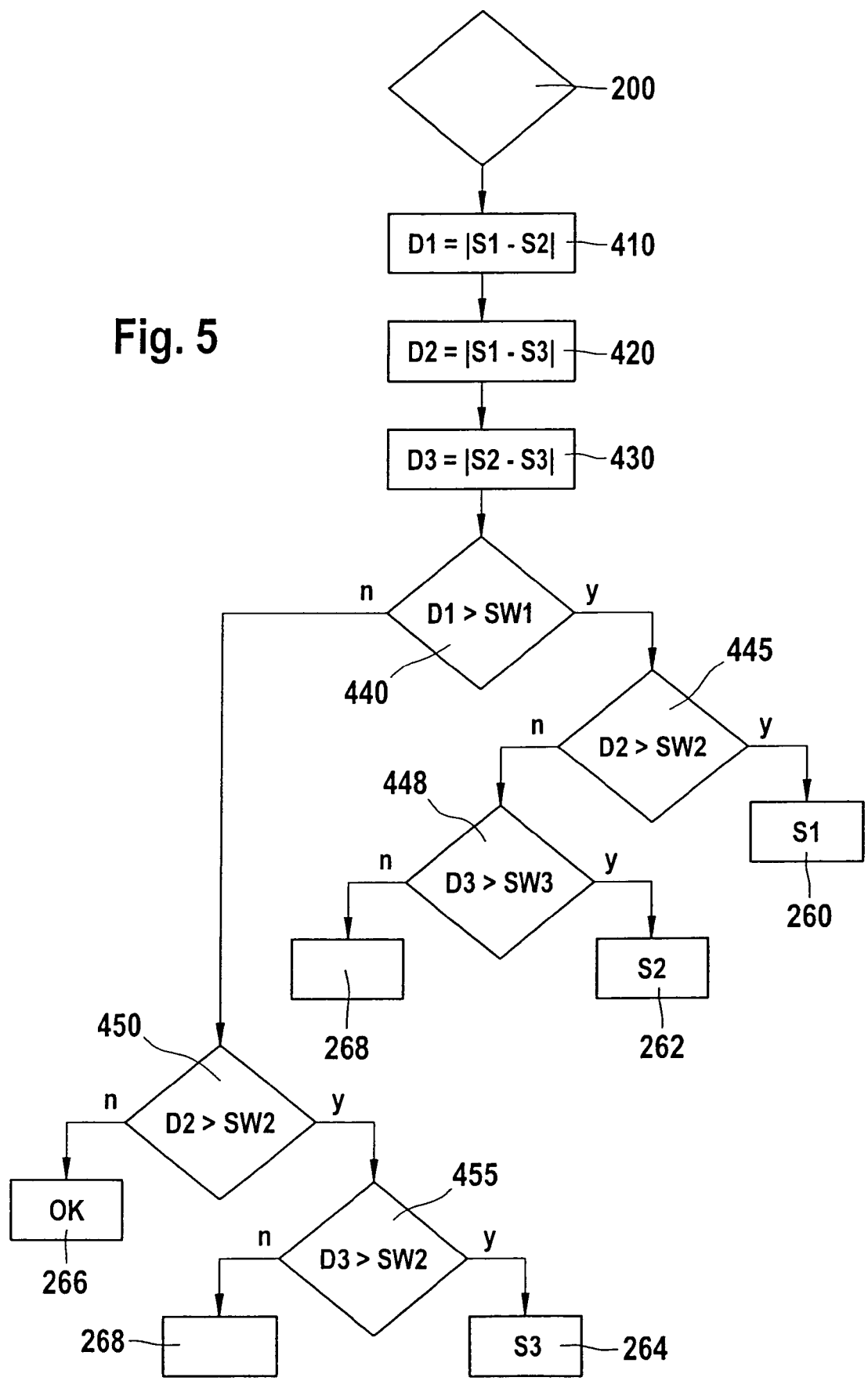
FIG. 5 shows a flow chart of another exemplary method according to the present invention.

FIG. 5 shows another exemplary embodiment. In this embodiment, the reference signal is also obtained from a measure of a sensor signal S1, S2, S3, S4, S5 of a single sensor 191, 192, 193, 194, 195 to be checked. In the simplest case, the reference signal is identical to sensor signal S1, S2, S3, S4, S5. This case is shown in FIG. 5. Furthermore, for reasons of clarity, the exemplary embodiment according to FIG. 5 is also limited to three sensors 191, 192, 193.

The difference between the exemplary embodiment of FIGS. 4 and 5 is that in the exemplary embodiment of FIG. 5, differences D1, D2, D3 are formed between all sensor signals S1, S2, S3. The absolute value of the difference between individual sensor signals S1, S2, S3 is determined in each case. If all differences D1, D2, D3 are less than a threshold value SW1, all sensors 191, 192, 193 are recognized as error-free. If one of differences D1, D2, D3 is greater than threshold value SW1, an error is recognized. However, the error cannot be assigned to a sensor 191, 192, 193. If two differences are greater than threshold value SW1, the particular sensor 191, 192, 193 that is used in both computations of the differences is recognized as defective. In this embodiment, not only may an error be recognized, but it may also be assigned to a certain sensor 191, 192, 193.

In first query 200, as in the previous exemplary embodiments, a check is performed of whether a steady-state operation, a standstill, or a cold start of internal combustion engine 100 exists. In a next function block 410, a first difference D1 between first sensor signal S1 and second sensor signal S2 is formed. As in all the previously described difference formations, the absolute value of the difference is preferably formed also in this case. In a function block 420, a second difference D2 is formed, representing the absolute value of the difference between first sensor signal S1 and third sensor signal S3. In a further function block 430, a third difference D3 is formed, representing the absolute value of the difference between second sensor signal S2 and third sensor signal S3.

In subsequent query 440, a check is performed to determine whether difference D1 is greater than threshold value SW1. If this is the case, a query 445 checks whether second difference D2 is greater than a second threshold value SW2. If this is the case, first sensor 191 is recognized as defective in a function block 260. If this is not the case, a query 448 checks whether third difference D3 is greater than a threshold value SW3. If this is the case, second sensor 192 is recognized as defective in the function block. If this is not the case, an error which is not assignable is recognized in a function block 268.

If it is determined in query 440 that difference D1 is not greater than first threshold value SW1, a query 450 checks whether second difference D2 is greater than second threshold value SW2. If this is not the case, error-free sensors 191, 192, 193 are recognized in function block 266. If this is the case, a query 455 checks whether third difference D3 is greater than threshold value SW2. If this is the case, third sensor 193 is recognized as defective in a function block 264. If this is not the case, an error which is not assignable is recognized in a function block 268.

What is claimed is:

1. A method for checking at least three sensors which detect a measured quantity in an area of an internal combustion engine, the method comprising:
   comparing a measure for the sensor signal of the particular sensor to be checked to a reference signal;
   obtaining the reference signal from at least one part of the sensor signals of the sensors to be checked;
   recognizing a sensor as defective based on a comparison between the measure for the sensor signal and the reference signal;
   performing the check in one of a steady-state operation, at a standstill, and after a cold start of the internal combustion engine; and
   detecting the steady-state operation or the standstill or the cold start of the internal combustion engine based on a comparison between a sensor signal of at least one selected sensor having a slow rate of change and a sensor signal of a sensor to be checked.

2. The method of claim 1, wherein the reference signal is formed from a mean value of a measure of the sensor signals of at least one part of the sensors to be checked.

3. The method of claim 2, wherein each of the sensor signals is weighted with a predefined factor when forming the mean value.

4. The method of claim 1, wherein a sensor is recognized as defective if the difference between the measure for the sensor signal and the reference signal exceeds a predefined threshold value.

5. The method of claim 1, wherein the particular sensor whose measure for the sensor signal is the farthest from the reference signal is recognized as defective.

6. The method of claim 1, wherein the reference signal is obtained from a measure of a sensor signal of a single sensor to be checked.

7. The method of claim 1, wherein the standstill of the internal combustion engine is detected, a timer is provided which is started when a standstill is detected, and the check is provided after the elapse of a predefined time period.

8. The method of claim 1, wherein the sensor signal of a sensor recognized as defective is not taken into account in determining the reference signal.

9. The method of claim 1, wherein no check is performed if the number of sensors recognized as defective exceeds a predefined number.

10. The method of claim 1, wherein the measured quantity is a temperature.

* * * * *